United States Patent
Cho et al.

(10) Patent No.: US 9,572,194 B2
(45) Date of Patent: Feb. 14, 2017

(54) METHOD AND DEVICE FOR DETERMINING CONTINUOUS SESSION SUPPORT DURING SUPPORT OF LIMONET IN MOBILE COMMUNICATION SYSTEM

(75) Inventors: Song Yean Cho, Seoul (KR); Beom Sik Bae, Suwon-si (KR); Chae Gwon Lim, Seoul (KR); Sang Soo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 663 days.

(21) Appl. No.: 14/110,488

(22) PCT Filed: May 16, 2012

(86) PCT No.: PCT/KR2012/003852
§ 371 (c)(1),
(2), (4) Date: Oct. 8, 2013

(87) PCT Pub. No.: WO2012/157959
PCT Pub. Date: Nov. 22, 2012

(65) Prior Publication Data
US 2014/0029579 A1    Jan. 30, 2014

(30) Foreign Application Priority Data

May 16, 2011 (KR) .......................... 10-2011-0045924

(51) Int. Cl.
*H04L 12/28* (2006.01)
*H04W 76/04* (2009.01)
(Continued)

(52) U.S. Cl.
CPC ........... *H04W 76/045* (2013.01); *H04W 8/082* (2013.01); *H04W 76/022* (2013.01); *H04W 84/045* (2013.01)

(58) Field of Classification Search
None
See application file for complete search history.

(56) References Cited

U.S. PATENT DOCUMENTS

2012/0189016 A1* 7/2012 Bakker ............... H04W 76/021 370/401
2012/0207129 A1* 8/2012 Sun ..................... H04W 76/027 370/331

(Continued)

FOREIGN PATENT DOCUMENTS

| KR | 10-2010-0119349 A | 11/2010 |
|---|---|---|
| KR | 10-2011-0020166 A | 3/2011 |
| WO | 2011-020624 A2 | 2/2011 |

*Primary Examiner* — Duc C Ho
(74) *Attorney, Agent, or Firm* — Jefferson IP Law, LLP

(57) ABSTRACT

According to an embodiment of the present invention, the invention discovers an address of a LGW, which can be sued in HeNB, determines whether session continuity is supported or not when a terminal using the LGW is moved to another HeNB in a network wherein a structure supporting Session Continuity and a structure not supporting Session Continuity are mixed, and processes active mode mobility and idle mode mobility based on the same. To this end, an embodiment of the present invention provides a method for transmitting the LGW and HeNB ID association information through DNS and S1AP, and a method for processing idle mode mobility and active mode mobility by using LGW information and HeNB ID association information in MME.

8 Claims, 5 Drawing Sheets

(51) Int. Cl.
*H04W 8/08* (2009.01)
*H04W 76/02* (2009.01)
*H04W 84/04* (2009.01)

(56) References Cited

U.S. PATENT DOCUMENTS

2013/0308527 A1* 11/2013 Chin .................... H04W 76/06
   370/328
2014/0059192 A1* 2/2014 Miklos ................. H04W 8/082
   709/221

* cited by examiner

METHOD AND DEVICE FOR DETERMINING CONTINUOUS SESSION SUPPORT DURING SUPPORT OF LIMONET IN MOBILE COMMUNICATION SYSTEM

TECHNICAL FIELD

The present disclosure relates to an apparatus and method for determining session continuity in the mobile communication system supporting LIMONET.

BACKGROUND ART

In the conventional residential network, Local IP Access (LIPA) is supported only in the situation where Local-Gateway (Local-GW) is collocated with a Home evolved Node B (HeNB). FIG. 1 is a diagram illustrating architecture of a network supporting LIPA but not supporting Session Continuity.

Referring to FIG. 1, the HeNB is also referred to as Closed Subscribed Group (CSG) cell which permits the access of only the UEs preregistered with a specific group (i.e. CSG). The CSG cell may be a home cell deployed within a small area such as personal residential area or company/local area network cells deployed within a wide area for a company or specific organization. A femto cell eNB 150 according to an embodiment of the present disclosure provides only the UE registered therewith with the mobile communication service and broadcasts the identifier of a predetermined group registered therewith, i.e. CSG ID, in a System Information Block (SIB). The LGW (HeNB GW) is responsible for establishing a connection between the SGW and HeNB. The UE may connect to the core network via the HeNB.

The Mobility Management Entity (MME) manages the UE in idle mode and selects Packet Data Network (PDN) gateway and serving gateway. The MME also processing bearer signal generated by the UE the Serving Gateway (SGW) acts as mobility anchor in handover between eNBs or between 3GPP wireless networks. The Packet Data Network Gateway (PGW) allocates IP address to the UE, performs packet data-related function of the core network, and acts as mobility anchor in handover between 3GPP and non-3GPP wireless networks. The PGW also determines the bearer band provided to the subscriber and is responsible for packet data forwarding and routing function.

In the enterprise network structured as shown in FIG. 1, one or more HeNBs may exist in the same enterprise network and, in this case, it is required to support session continuity when the UE moves between HeNBs in the same enterprise network.

DISCLOSURE OF INVENTION

Technical Problem

The present disclosure proposes a method of checking LGW address for use in HeNB, determining whether to support session continuity when the UE using the LGW move to another HeNB, and handling active mode mobility and idle mode mobility based thereon in the network in which the Session Continuity-supportable structure and Session Continuity-non-supportable structure coexist.

Solution to Problem

In a mobile communication system supporting LIMO-NET according to an embodiment of the present invention, a method for determining support of session continuity includes checking, at MME when a terminal generates a PDN connection request message, whether LIPA is applicable, transmitting, when LIPA is applied, a GW query from the MME to a DNS server, responding, at the DNS server, to the MME with local GW address and associated HeNB IDs, and processing, at the MME, PDN connection after selecting a local GW and storing associated HeNB IDs.

In a mobile communication system supporting LIMO-NET according to an embodiment of the present invention, a method for determining support of session continuity includes transmitting, at a HeNB when a terminal generates a PDN connection request message, HeNB-associated LGW addr or LGW and LGW-associated HeNB IDs to an MME, checking, at the MME, whether the LIPA is applicable, and processing, when the LIPA is applicable, PDN connection using the LGW addr transmitted by the HeNB.

In a mobile communication system supporting LIMO-NET according to an embodiment of the present invention, an apparatus for determining support of session continuity includes a UE which generates a PDN connection request message, an MME which sends, when LIPA is applicable in receiving the PDN connection request message, a GW query, selects local GW in response to the GW query, stores associated HeNB IDs, and processes the PDN connection, and a DNS server which sends the MME a GW query response message including local GW address and associated HeNB ID according to the GW query transmitted by the MME.

In a mobile communication system supporting LIMO-NET according to an embodiment of the present invention, an apparatus for determining support of session continuity includes a UE which generates a PDN connection request message, an HeNB which transmits HeNB-associated LGW addr or LGW addr and LGW-associated HeNB IDs, and an MME which checks whether LIPA is applicable and, when LIPA is applicable, processes PDN connection using LGW addr transmitted by the HeNB.

Advantageous Effects of Invention

When configuring a network supporting LIPA and LIMO-NET, it is possible to check LGW address for use in HeNB, determine whether to support session continuity when the UE using the LGW move to another HeNB, and handle active mode mobility and idle mode mobility based thereon in the network architecture in which the Session Continuity-supportable structure and Session Continuity-non-supportable structure coexist.

MODE FOR THE INVENTION

The specification and drawings are to be regarded in an illustrative rather than a restrictive sense in order to help understand the present invention. It is obvious to those skilled in the art that various modifications and changes can be made thereto without departing from the spirit and scope of the invention.

Figure 1:
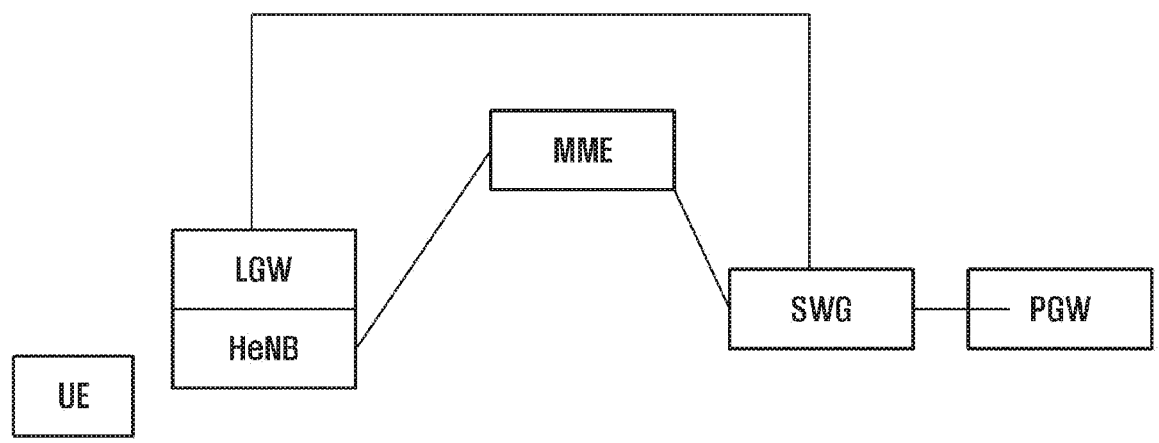
FIG. 1 is a diagram illustrating the network structure supporting LIPA compatible with session continuity.
Figure 2:
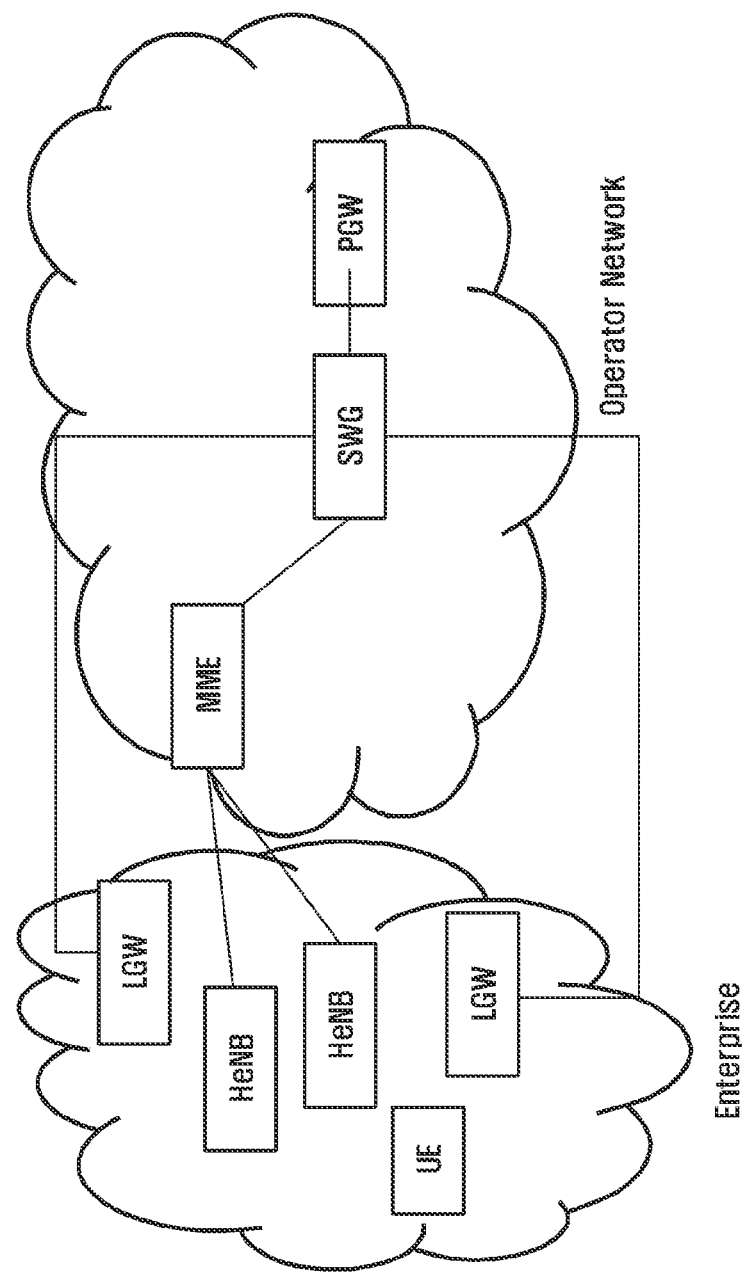
FIG. 2 is a diagram illustrating the network structure supporting LIMONET incompatible with session continuity.

In the case that the mobile session continuity is supported, LGW(s) of the enterprise network stands alone other than is collocated with HeNB in the Local Network. The LIPA Mobility and SIPTO at the Local Network (hereinafter, referred to as LIMONET) structured in such a way is depicted in FIG. 2.

When configuring the network to support LIPA and LIMONET, if the session continuity-supporting structure and session continuity non-supporting-structure coexist, this may cause a problem in supporting session continuity of the UE roaming the HeNBs.

Figure 3:
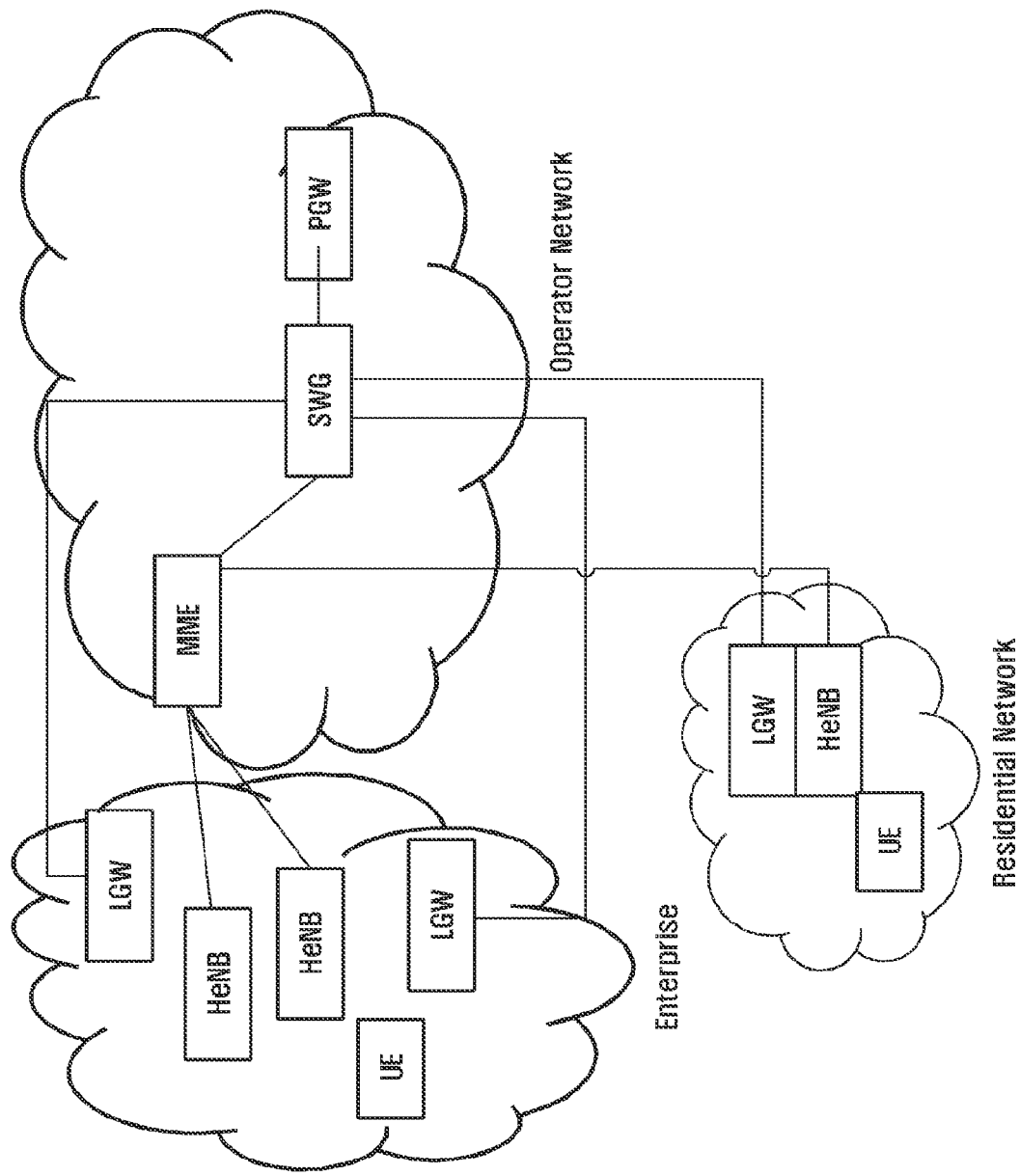
FIG. 3 is a diagram illustrating the network structure supporting both the LIPA and LIMONET.

FIG. 3 is a diagram illustrating a structure of the network supporting both the LIPA and LIMONET.

Referring to FIG. 3, the mobile communication system network includes an enterprise network 100 which supports Session Continuity, a Residential Network 300 which does not support Session Continuity, and an Operation Network 200 of the networks 100 and 300. That is, FIG. 3 shows the network configuration supporting LIPA and LIMONET in which Session Continuity supporting structure and Session Continuity non-supporting structure coexist. In the network structure of FIG. 3, MME faces the case of supporting session continuity and the case of non-supporting session continuity.

An embodiment of the present disclosure makes it possible to check the address of LGW capable of being used by HeNB, determine whether to support session continuity for the UE using the LGW moves to another HeNB, and handles active mode mobility and idle mode mobility based thereon. An embodiment of the present disclosure proposes a method for transferring LGW and HeNB ID association information to MME through DNS and S1AP and handling, at MME, the idle mode mobility and active mode mobility using the LGW information and LGW and HeNB ID association information.

First, a description is made of a method using DNS or MME configuration.

Currently, a solution of registering a stand-alone LGW with the DNS of the Operator Network has been proposed. However, this method has to register the local GW information with DNS, display whether the GW is local or not, and require different MME GW selection operations depending on whether the session continuity is supported or not, resulting in increase of complexity. In the case that the UE moves to another HeNB, the stand-alone LGW has to determine whether the stand-alone LGW is accessible in the HeNB to which the UE has moved. To solve this problem, in an embodiment of the present disclosure, if the session continuity is not supported, this is processed using the LGW address transmitted by the HeNB according to the method as specified in the current standard. In the case that the session continuity is supported, the session continuity is supported in such a way of acquiring the LGW information through DNS Query or MME configuration which includes all the IDs of the HeNBs connected to the stand-alone LGW. The procedure is shown in FIG. 4.

Figure 4:
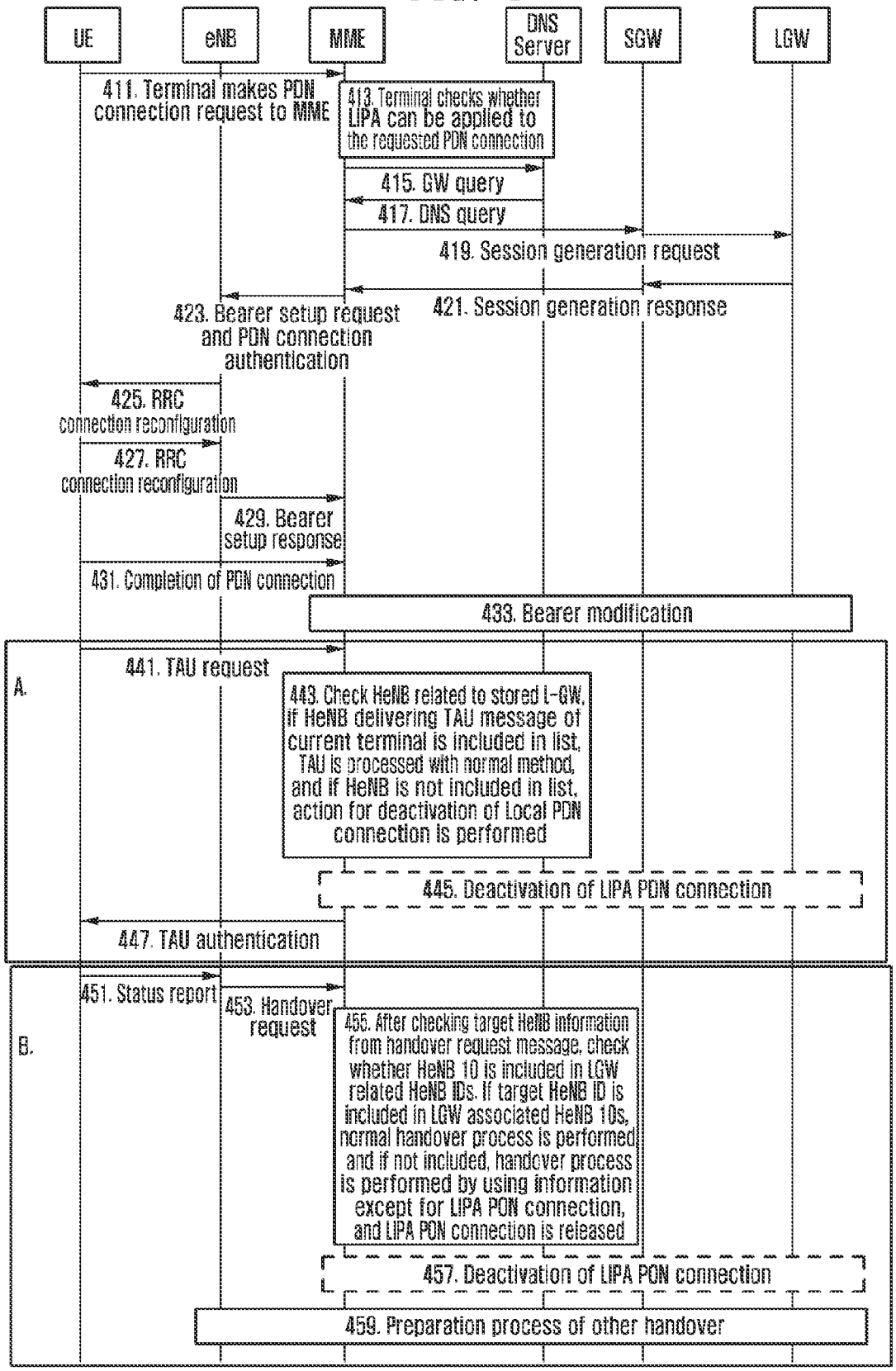
FIG. 4 is a diagram illustrating a procedure of DNS-based solution according to an embodiment of the present disclosure.

FIG. 4 is a diagram illustrating a procedure of performing the solution using DNS.

Referring to FIG. 4, the UE sends the MME a PDN connection request at operation 411. Upon receipt of the request, the MME checks whether LIPA is applicable to the PDN connection requested by the UE (LIPA can be used?) at operation 413. If LIPA is applicable, the MME sends GW query (GW DNS query (including HeNB ID, etc.)) with the parameters of ECGI and CSG id to the DNS server at operation 415. Then the DNS server sends a response including IDs of HeNBs associated with the Local GW along with the Local GW address (DNS Query (LGW addr(associated HeNB IDs)) at operation 417.

Then the MME selects the Local GW indicated by the DNS server as GW, stores the IDs of the associated HeNBs, handles the selected Local GW as GW to process the PDN connection request at operation 419. That is, the MME requests the Serving Gateway (SGW) for establishing a session (create session request (PGW addr=LGW addr)) and SGW sends the request to the LGW at operation 419.

Then the LGW sends the SGW a create session response and the SGW forwards this to the MME at operation 421. Then the MME sends the HeNB a Bearer Setup Request/PDN connection connectivity Accept and the HeNB notifies the UE of RRC connection reconfiguration. The UE notifies the eNB of RRC connection reconfiguration complete at operation 423 and the HeNB notifies the UE of RRC connection reconfiguration at operation 425. Then the UE notifies the eNB of RRC connection reconfiguration complete at operation 427. Then the eNB sends the MME a Bearer Setup Response message at operation 429, and the UE sends the MME a PDN connectivity complete message at operation 431. Then the MME and LGW process the PDN connection request of the UE by modifying bearer to connect S1 User plane at operation 433. Here, operations 421 to 411 are performed in the same procedure of general PDN connection request processing procedure. After processing the UE's PDN connection request, the UE mobility may occur. At this time, the UE mobility may be classified into one of Idle Mode Mobility and Active Mode Mobility.

First, a description is made of the operation in the case where Idle Mode Mobility occurs.

If the UE in idle mode moves, it sends the eNB a Tracking Area Update (TAU) request message at operation 441. Upon receipt of the TAU, the MME checks the IDs of HeNBs associated with the LGW at operation 443 and, if the HeNB relayed the TAU message of the current UE exists in the list, processes the TAU in the normal process and, otherwise, performs the operation for deactivating the Local PDN connection (Check if the current HeNB ID exists in the stored associated HeNB IDs with LGW in use, YES→perform normal TAU update procedure, NO→deactivate LIPA PDN connection with the existing PDN deactivation procedure and TAU update procedure with the remaining PDN connections). If the HeNB transmitted the TAU message does not exist in the list, the MME performs deactivation of LIPA PDN connection. At this time, if the LGW is collocated with HeNB, this means only one associated HeNB and thus, if the HeNB sent the TAU differs from the associated HeNB, LIPA PDN connection deactivation is performed always. The MME sends the UE a Tracking Area Update (TAU) Accept message at operation 447.

As described above, when the Idle Mode Mobility occurs, the MME checks the stored HeNB IDs associated with stored LGW and, if there is no HeNB transmitted the TAU message of the current UE in the list, deactivates the Local PDN connection.

Second, a description is made of the operation in the case where Active mode mobility occurs.

The UE approached close to the new HeNB reports the target cell information to the source HeNB (Status Report (Target Cell)) at operation 451. Upon receipt of this information, the HeNB triggers handover (Handover Required (Target eNB ID, Target TAI, etc.) at operation 453. Then MME checks the target HeNB information in the handover required message and whether the target HeNB ID is included in the LGW associated HeNB IDs at operation 455. At this time, if the target HeNB ID is included in the LGW associated HeNB IDs, the MME performs normal handover procedure and, otherwise, performs handover using the information with the exception of LIPA PDN connection-related information and releases the LIPA PDN connection (Check if the current Target eNB ID exists in the stored associated HeNB IDs with LGW in use, YES→perform normal Handover procedure, NO→deactivate LIPA PDN connection with the existing PDN deactivation procedure and Handover procedure with the remaining PDN connections). Accordingly, if the target HeNB ID is not included in the LGW associated HeNB IDs, the MME performs Local PDN connection deactivation procedure at operation 457.

After checking the target HeNB information from the handover required message, if the target HeNB ID is not included in the LGW associated HeNB IDs, the handover procedure is progressed with the information with the exception of LIPA PDN connection information and releases the LIPA PDN connection.

The information received from the DNS may be configured and used in the MME. At this time, it is necessary to configure the information on the local network to the operator network and, in the case of X2 handover with involvement of MME, the session continuity can be handled only after the completion of the handover. The problem of the method using DNS or MME configuration can be solved with the solution using S1AP message.

Figure 5:
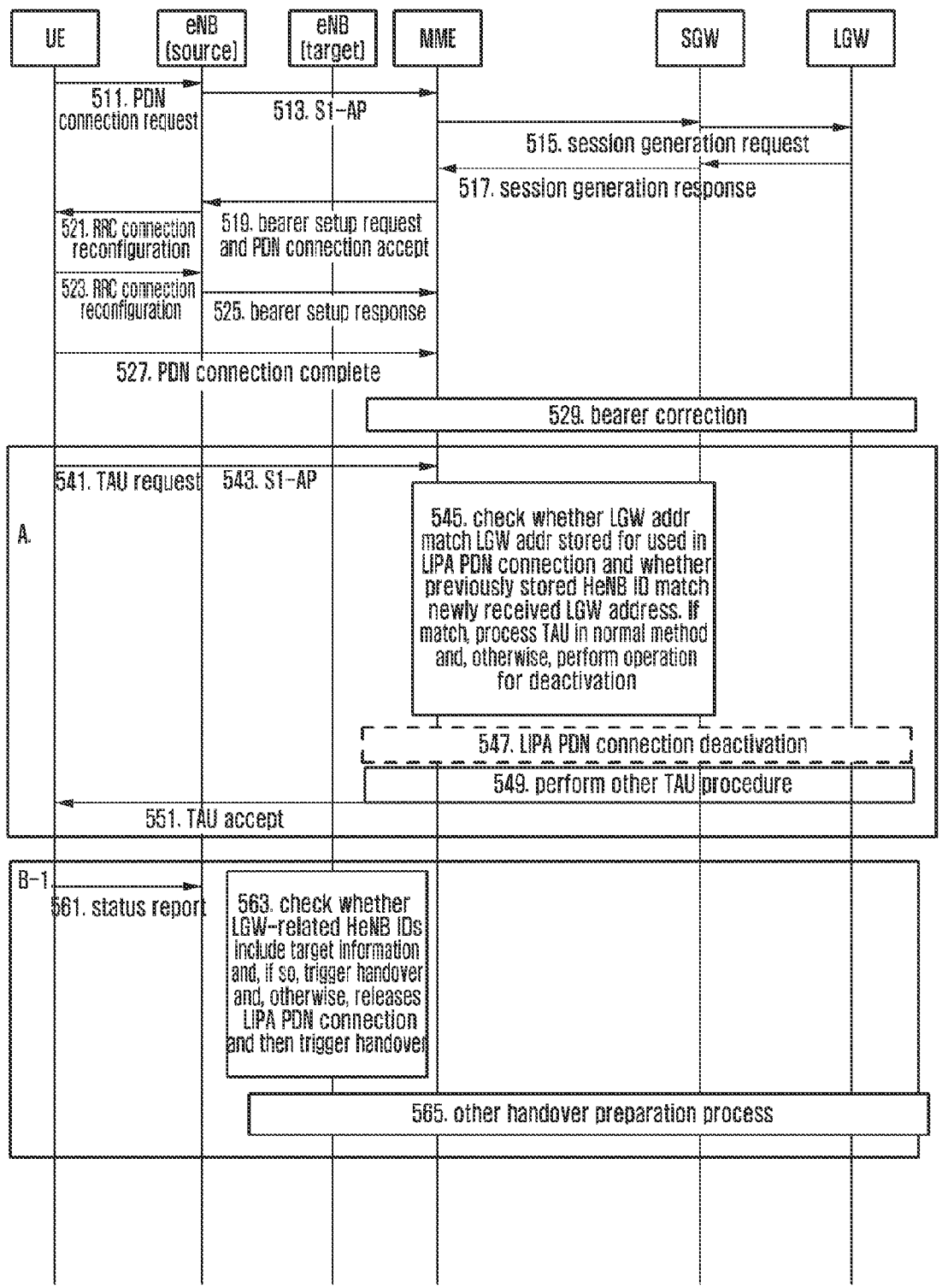
FIG. 5 is a diagram illustrating a procedure of S1AP message-based solution according to an embodiment of the present disclosure.

Second, a description is made of the method using S1AP. FIG. 5 is a flowchart illustrating a procedure using S1AP message.

Referring to FIG. 5, the UE sends a PDN connection request (RRC request (PDN connectivity request)) at operation 511. The PDN connectivity request message is the RRC complete message sent to the HeNB (here, source eNB) and delivered to the MME in Uplink NAS Transport message (S1 AP (PDN Connectivity Request, LGW addr, associated HeNBs) at operation 513. At this time, the following informations are transmitted to the MME depending on the condition of the HeNB.

A) when HeNB is collocated with Local-GW: Local GW address

B) when HeNB is associated with standalone Local-GW: Local GW address and associated HeNB IDs Note: when applying attach, the message transmitted by HeNB is Initial UE message.

Upon receipt of this message, the MME checks whether LIPA is applicable to the PDN connection and, if so, handles the LGW as GW using the local GW address transmitted by the HeNB to process the PDN connection request (create session Request (PGW addr=LGW addr, etc.). That is, the MME requests the Serving Gateway (SGW) for create a session (Create session request (PGW addr=LGW addr)), and the SGW requests the LGW to create session.

The LGW sends the SGW a Create Session Response and the SGW forwards the Create Session Response to the MME at operation 517. Then the MME sends the HeNB a Bearer Setup Request/PDN connectivity Accept and the HeNB sends the UE an RRC Connection Reconfiguration at operation 521. The UE sends the eNB an RRC Connection Reconfiguration Complete at operation 523. The eNB sends the MME a Bearer Setup Response message at operation 525 and the UE sends the MME a PDN connective complete message at operation 527. The MME and LGW process the PDN connection request of the UE by modifying bearer to connect S1 User Plane. Here, operations 517 to 529 are progressed in the same procedure of processing normal PDN connection request.

As described above, after processing the PDN connection request, the UE may generate Idle Mode Mobility or Active Mode Mobility.

First, a description is made of the operation procedure in the case where the idle mode mobility occurs.

If the Idle Mode Mobility occurs after the UE enters the idle state, the UE sends the Tracking Area Update (TAU) Request message to the eNB (source) at operation 541, and the eNB performs tracking area update by forwarding the TAU request to the MME in the S1 AP message (PDN Connectivity Request, LGW addr, associated HeNBs) at operation 543. That is, the Tracking Area Update (TAU) message is sent to the HeNB in RRC complete message at operation 541 and then delivered to the MME in the Initial UE message at operation 543. At this time, the S1AP message includes the following information according to the condition of the HeNB.

A) when HeNB is collocated with Local-GW: Local GW address

B) when HeNB is associated with standalone Local-GW: Local GW address and associated HeNB IDs Then the MME checks whether the received LGW addr matches the LGW addr stored for use in LIPA PDN connection and whether the previously used HeNB ID matches the newly received LGW address at operation 545. If the two addresses match each other, the MME performs the conventional TAU procedure. If the two addresses mismatch, this means the session continuity is not supported such that the MME deactivates the LIPA PDN connection at operation 547 and performs TAU procedure at operation 551 (Check if LGW addr is the same with LGW addr in use and the previous HeNB exists the received associated HeNB IDs, YES→perform normal TAU update procedure, NO→deactivate LIPA PDN connection with the existing PDN deactivation procedure and TAU update procedure with the remaining PDN connections).

That is, if Idle Mode Mobility occurs, the MME checks whether the received LGW addr matches the LGW addr stored for use in LIPA PDN connection and whether the previously used HeNB ID matches the newly received LGW address. If the addresses mismatch, this means that the session continuity is not supported so as to deactivate LIPA PDN connection and progresses the TAU procedure.

Second, a description is made of the X2 HO procedure in case that active Mode Mobility occurs.

The UE approached close to the new HeNB reports the target cell information to the source HeNB at operation 561. Upon receipt of this information, the HeNB checks where there is any target cell information in its LGW associated HeNB IDs and, if so, triggers handover and, otherwise, releases the LIPA PDN connection and then trigger handover (If target cell is a HeNB and the target HeNB exists in the associated with HeNB IDs for LGW used by source HeNB, Handover is triggered). Afterward, the handover procedure between eNB (target) and LGW (Other Handover preparation steps) is performed at operation 565.

The invention claimed is:

1. A method comprising:
checking, at a mobility management entity (MME), when a terminal generates a packet data network (PDN) connection request message, whether local internet protocol access (LIPA) is applicable;

transmitting, at the MME, when LIPA is applied, a gateway (GW) query to a domain name system (DNS) server;
receiving, at the MME, local gateway (LGW) address and associated home evolved node B (HeNB) identifications (IDs) from the DNS server; and
processing, at the MME, PDN connection after selecting a LGW and storing associated HeNB IDs.

2. The method of claim 1, further comprising:
checking, at the MME when the terminal in idle mode generates a tracking area update (TAU) request message, a stored LGW and associated HeNB IDs; and
processing, at the MME, when HeNB transmitted the TAU request message of the terminal is not included in a list, the TAU request message with deactivation of local PDN connection.

3. The method of claim 1, further comprising:
checking, at the MME in active mode handover, whether the checked target HeNB ID is included in the LGW associated HeNB IDs;
performing, at the MME, when the target HeNB ID is not included in the LGW associated HeNB IDs, using the information excluding LIPA PDN connection and releasing the LIPA PDN connection.

4. A method comprising:
receiving, at a mobility management entity (MME), a message comprising information of packet data network (PDN) connection request from a home evolved node B (HeNB), wherein the message comprises, when the HeNB is collocated with local gateway (LGW), HeNB-associated LGW address and, when the HeNB is associated with standalone LGW, LGW address and LGW-associated HeNB identifications (IDs);
checking, at the MME, whether the local internet protocol access (LIPA) is applicable; and
processing, at the MME, when the LIPA is applicable, PDN connection using the LGW address transmitted by the HeNB.

5. The method of claim 4, further comprising:
receiving, at the MME, when the terminal transmitting the tracking area update (TAU) request message is in idle mode, HeNB-associated LGW address or LGW address and LGW-associated HeNB IDs from the HeNB;
checking, at the MME, whether the received LGW address matches the LGW address stored for LIPA PDN connection; and
processing, at the MME, when the LGW addresses mismatch, the TAU request message with deactivation of the local PDN connection.

6. The method of claim 4, further comprising:
transmitting, at the terminal when mobility of terminal in active mode occurs, target HeNB information to a source HeNB; and
releasing, at the source HeNB when the LGW-associated HeNB IDs include no target HeNB, LIPA connection and triggering handover.

7. An apparatus comprising:
a terminal which generates a packet data network (PDN) connection request message;
a mobility management entity (MME) which transmits, when local internet protocol access (LIPA) is applicable in receiving the PDN connection request message, a gateway (GW) query, selects local gateway (LGW) in response to the GW query, stores associated home evolved node B (HeNB) identifications (IDs), and processes the PDN connection; and
a domain name system (DNS) server which transmits to the MME a GW query response message including LGW address and associated HeNB IDs according to the GW query transmitted by the MME.

8. An apparatus comprising:
a UE which generates a packet data network (PDN) connection request message;
a home evolved node B (HeNB) which transmits a message comprising information of packet data network (PDN) connection request, wherein the message comprises, when the HeNB is collocated with local gateway (LGW), HeNB-associated LGW and address, when the HeNB is associated with standalone LGW, LGW address and LGW-associated HeNB identifications (IDs); and
a mobility management entity (MME) which checks whether local internet protocol access (LIPA) is applicable and, when LIPA is applicable, processes PDN connection using LGW address transmitted by the HeNB.

* * * * *